Dec. 23, 1958    H. W. ROBB    2,865,664
FAUCET SAFETY HANDLE
Filed Feb. 4, 1955

INVENTOR.
HAROLD W. ROBB
BY HIS ATTORNEYS.
HARRIS, KIECH, FOSTER & HARRIS

United States Patent Office 2,865,664
Patented Dec. 23, 1958

2,865,664

FAUCET SAFETY HANDLE

Harold W. Robb, Pomona, Calif.

Application February 4, 1955, Serial No. 486,082

1 Claim. (Cl. 287—119)

The present invention relates to a new and improved faucet safety handle.

More specifically the present invention relates to a handle used on a hot water faucet which is designed to prevent the average young child from turning on the faucet causing damage. The tendency of the younger generation to play with water in wash basins, sinks, and the like is very well known at the present time. Virtually every individual who has had contact with children is cognizant of this tendency. Unfortunately, none of the handles for hot water faucets designed to be used in the average household and being presently manufactured are so constructed that the average child cannot turn on the water. Further, as nearly as is known, no faucet constructions are presently being marketed in the United States which incorporate a handle structure that may be either engaged or disengaged by an adult when desired.

It is a broad object of the present invention to provide a new and improved faucet safety handle of the type indicated in the preceding discussion. A more specific object of the present invention is to provide a faucet safety handle which is normally left in the disengaged position, so that as the handle is turned the faucet connected to it is not opened, but which can be engaged with an appropriate member formed upon this faucet so that the faucet may be either opened or closed as desired. Further objects of the present invention, as well as many advantages of it, will be apparent in the remainder of the specification, including the appended claims, and from the accompanying drawing in which:

Figure 1:
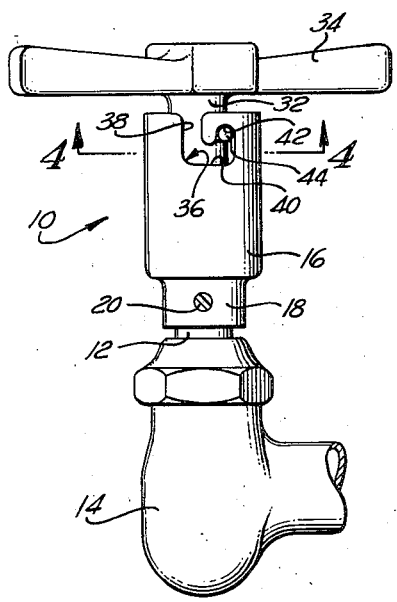
Fig. 1 is a side view of a faucet safety handle of the present invention attached to a conventional faucet, this safety handle being located in an engaged position.

The present invention is concerned with a faucet safety handle employing a supporting member or housing member comprising a cylindrical sleeve which is normally attached to a projecting shaft of a conventional faucet structure. This sleeve includes a bayonet slot or J-shaped notch formed in a side wall thereof, spring means located within this sleeve, a handle shaft located within the sleeve, a handle attached to this handle shaft whereby the spring means normally urges said handle and said handle shaft away from the sleeve, stop means limiting the movement of said handle shaft away from the sleeve, and projection means formed upon the handle shaft for engaging the notch formed within the sleeve.

Referring to the accompanying drawing, there is shown a complete faucet safety handle 10 attached to a shaft 12 projecting from a conventional faucet 14. The faucet safety handle includes a housing member comprising an enlarged cylindrical sleeve 16 to the lower extremity of which there is attached a bushing 18 normally secured to the shaft 12 by means of a conventional set screw 20, although, obviously, other means of attachment may be employed.

Within the sleeve 16 there is located a coil spring 22 which normally bears against the bushing 18 and against a cup-shaped sleeve 24 fitting within the sleeve 16 so as to be capable of movement within this latter sleeve. Within the top of the sleeve 16 there is located an annular groove 26 within which there is placed a split snap ring 28. This snap ring 28 serves as a stop means engageable with the cup-shaped sleeve 24 to keep the sleeve from moving to the exterior of the sleeve 16. Other equivalent structures, such as an internal flange, can be employed instead of the snap ring structure shown.

The cup-shaped sleeve 24 is attached by means of a screw 30 to a shaft 32 which forms part of a handle member and which normally projects from the sleeve 16 out past the snap ring 28. Secured to this shaft 32 at the upper extremity thereof remote from the sleeve 16 and also forming part of the aforesaid handle member is a conventional handle 34 to be used in turning the faucet 14 on and off. This handle 34 may be of any desired shape or configuration.

Within the sleeve 16 there is formed a bayonet slot or J-shaped notch 36 having an open end 38, a bottom 40, and a closed end 42. The open end 38 and the closed end 42 correspond in general to the ends of a line commonly drawn to represent the capital letter J. Upon the shaft 32 there is mounted a projecting pin 44 which is adapted to slide within the slot or notch 36 formed in the sleeve 16, the slot 36 and the pin 44 constituting interengageable means on the sleeve 16 and the shaft 32 for transmitting rotation of the latter to the former, as will be described.

Figure 2:
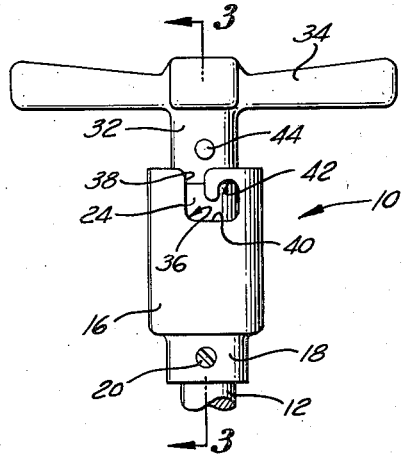
Fig. 2 is a view which is similar to Fig. 1, showing a faucet safety handle of the invention in a disengaged position.
Figure 3:
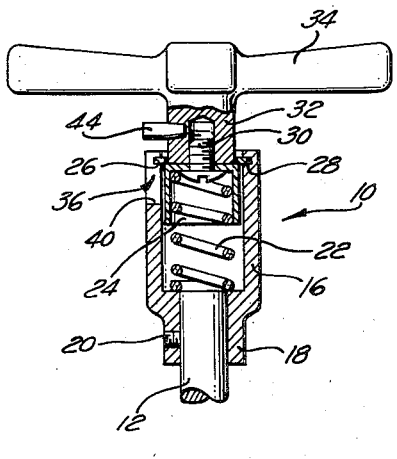
Fig. 3 is a cross-sectional view taken on line 3—3 of Fig. 2.
Figure 4:
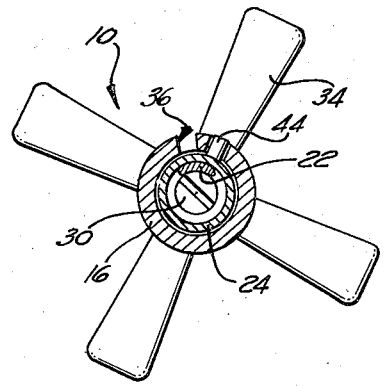
Fig. 4 is a cross-sectional view taken at line 4—4 of Fig. 1.

With the construction shown, when the various parts are assembled as indicated in Figs. 2 and 3 of the drawing, the handle 34 may be rotated by a child without causing the shaft 12 to rotate, thereby neither opening nor closing the faucet 14. The faucet safety handle 10, as shown in Figs. 2 and 3 of the drawing, is in what may be termed a disengaged position since the pin 44 does not catch upon or lock with any portion of the sleeve 16. When it is desired to actuate the faucet 14, either to open or close this faucet, the handle 34 is pushed against the pressure exerted by the spring 22, and simultaneously this handle is moved so that the pin 44 slides past the open end 38 of the notch 36. When the pin 44 strikes the bottom of this notch 36, the handle 34 is further rotated so that the pin 44 is directly beneath the closed end 42 of the notch 36. At this point the pressure upon the handle 34 is relieved, allowing the coil spring 22 to force this handle into an upper or engaging position such as is shown in Figs. 1 and 4 of the drawing, with the pin 44 securely held against rotation within the closed end 42. When the pin 44 is located in this position, the handle 34 may be turned, and the rotation of this handle is transmitted through the pin 44 to the sleeve 16 and thence to the shaft 12, causing the faucet 14 to be either opened or closed depending upon the direction of rotation of the handle 34.

It should be obvious from the above description that the faucet safety handle of the present invention is a comparatively simple structure which is effectual for the purpose intended. Further, the structure of the present invention may be easily manufactured with a minimum of expense using conventional equipment and should be able to compete commercially with other faucets not having the safety features of the present invention.

Obviously, a number of minor modifications may be made within the scope of the present invention without departing from the essential teachings of it. All such modifications are to be considered as part of the inventive concept insofar as they are defined in the appended claims.

I claim as my invention:

In a safety handle for a faucet having a projecting faucet shaft, the combination of: a supporting member mountable on the faucet shaft; means for fixedly securing said supporting member to the faucet shaft against rotation relative thereto; a handle member telescopically connected to and carried by said supporting member and reciprocable relative thereto axially of the faucet shaft between retracted and extended positions relative to said supporting member, said handle member being freely rotatable relative to said supporting member about the axis of the faucet shaft when in said extended position; spring means engaging said supporting member and said handle member for biasing said handle member toward said extended position thereof; interengageable stop means on said handle member and said supporting member for preventing movement of said handle member beyond said extended position thereof in response to the biasing action of said spring means; and interengageable means on said handle member and said supporting member and responsive to movement of said handle member from said extended position to said retracted position for transmitting rotation of said handle member to said supporting member for transmission thereby to the faucet shaft, including a J-shaped bayonet slot in one of said members and a pin on the other of said members insertable into said bayonet slot, said bayonet slot including an open-ended portion extending generally parallel to the axis of the faucet shaft, an intermediate portion generally perpendicular to said open-ended portion, and a closed-ended portion generally parallel to said open-ended portion and located alongside of said open-ended portion, said pin being movable through said open-ended portion and said intermediate portion into said closed-ended portion into engagement with a closed end of said closed-ended portion, said spring means biasing said pin into engagement with said closed end of said closed-ended portion of said bayonet slot when said pin is disposed therein, whereby to lock said handle member and said supporting member together against relative rotation.

References Cited in the file of this patent

UNITED STATES PATENTS

| | | |
|---|---|---|
| 649,444 | Good | May 15, 1900 |
| 695,353 | Turner | Mar. 11, 1902 |
| 1,285,065 | Davis | Nov. 19, 1918 |
| 1,423,010 | Neviczky | July 18, 1922 |
| 2,309,478 | Rau | Jan. 26, 1943 |
| 2,501,008 | Schramm | Mar. 21, 1950 |
| 2,555,593 | Lee | June 5, 1951 |
| 2,666,339 | Schwarz | Jan. 19, 1954 |

FOREIGN PATENTS

| | | |
|---|---|---|
| 1,031,386 | France | Mar. 18, 1953 |